(No Model.)

J. MORRISON.
NUT LOCK.

No. 455,347. Patented July 7, 1891.

Witnesses
Thos E. Robertson
Milton A. White

Inventor
Joseph Morrison
By T. J. W. Robertson
Attorney

UNITED STATES PATENT OFFICE.

JOSEPH MORRISON, OF WINDSOR, CANADA.

NUT-LOCK.

SPECIFICATION forming part of Letters Patent No. 455,347, dated July 7, 1891.

Application filed January 14, 1891. Serial No. 377,719. (No model.)

*To all whom it may concern:*

Be it known that I, JOSEPH MORRISON, a citizen of Canada, residing at Windsor, in the county of Essex, in the Province of Ontario, Canada, have invented a new and useful Nut-Lock, of which the following is a specification.

This invention relates to an improvement in nut-locks; and it consists in the peculiar construction, arrangement, and combinations of parts hereinafter more particularly described, and then definitely claimed.

The object of my invention is to provide a nut-lock that will not only be effective in locking, but will provide a greater adjustability than similar locks now in use.

Figure 1:
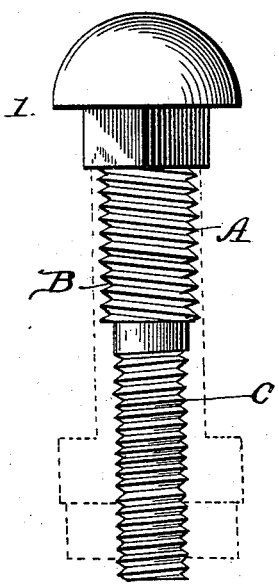
Figure 2:
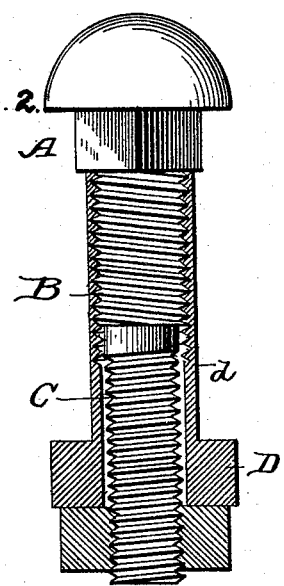
Figure 3:
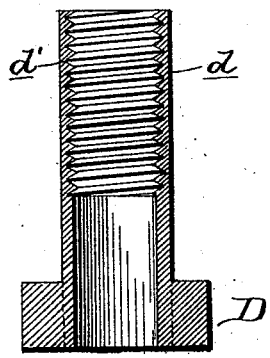

In the accompanying drawings, Figure 1 is a side elevation of my improved nut-lock with the nut and lock shown in dotted lines. Fig. 2 is a vertical central section of the same. Fig. 3 is a sectional view of the nut detached.

Referring now to the details of the drawings, A represents a bolt provided immediately below its head with a left-hand thread B, and a portion at its other end is made smaller in diameter, and on this reduced portion is a right-hand thread C.

D is a nut provided with a cylindrical extension $d$, projecting from the upper side of said nut and in line with the hole in it. In the upper part of this cylindrical extension is a thread $d'$, corresponding to and made to fit the enlarged thread B' on the bolt A.

E is an ordinary nut constructed to fit the thread on the reduced portion of the bolt A, and adapted to act as a jam-nut to lock the nut D.

The operation of my nut-lock is as follows: After the bolt A has been placed in its position the nut D is placed on the bolt A and screwed "home." When the nut D is as tight as possible, the nut E is placed on the smaller end of the bolt A and turned in the opposite direction from that in which the nut D was turned until it fits tight up against the said nut D.

From the above it is evident that my lock is not only effective, but that on account of the extension of the nut D the same bolt can be used for articles of varying thicknesses to much better advantage than where two ordinary nuts are used on right and left hand threads. It will also be evident that the extension of the nut D serves to aid or strengthen the bolt.

I have shown the blank nut D and its extension in one piece; but I sometimes make the extension of a tube and set the same firmly in a blank nut, as shown in dotted lines in Fig. 3. I sometimes make the thread near the head of the bolt much shorter where the bolt is intended to be used in places where the matter to be bolted together is of substantially uniform size—as, for instance, in railroad chairs and splices.

What I claim as new is—

1. The combination, with a bolt having a thread near its head and another one near its opposite end, of a nut having an extension fitting said thread near the head and constructed to enter the object being bolted, thus aiding in strengthening the bolt, and another nut fitting the thread on the opposite end, substantially as described.

2. The combination, with a bolt having a thread near its head and another one near its opposite end, said threads being cut in opposite directions, of a nut having an extension fitting said thread near the head and constructed to enter the object being bolted, thus aiding in strengthening the bolt, and another nut fitting the thread on the opposite end, substantially as described.

JOSEPH MORRISON.

Witnesses:
E. I. SCULLY,
T. E. ROBERTSON.